Figure 1:
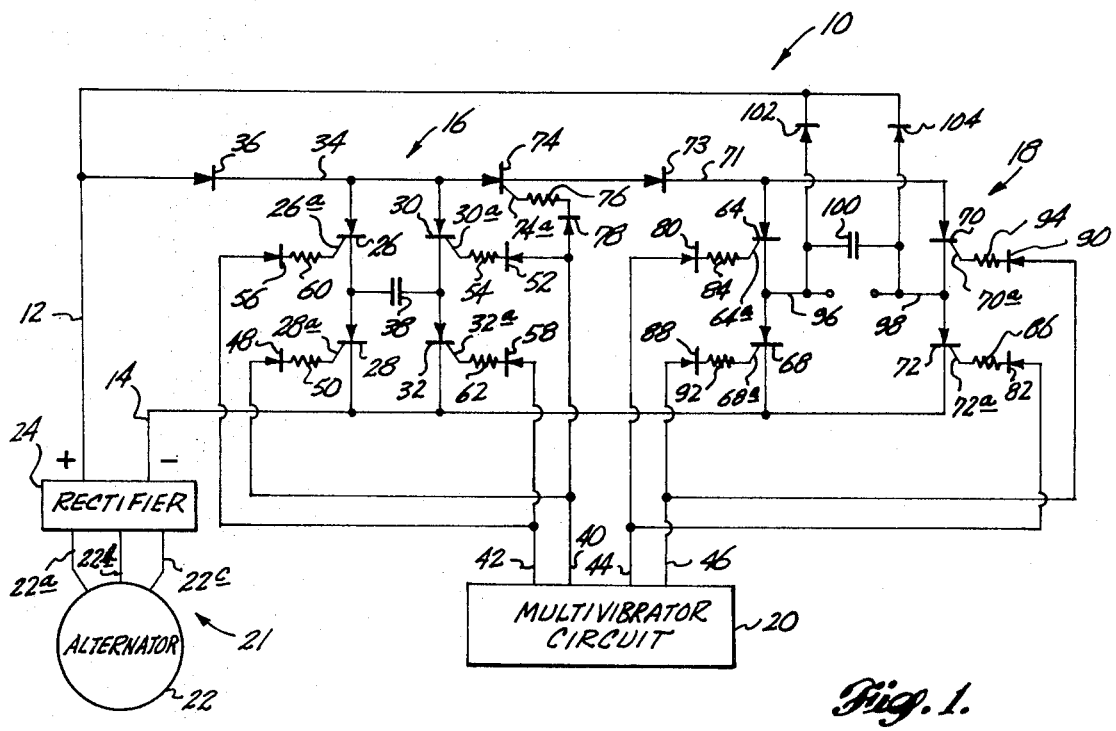

United States Patent

[11] 3,588,670

| [72] | Inventor | William L. King<br>Springfield, Oreg. |
|---|---|---|
| [21] | Appl No | 848,203 |
| [22] | Filed | Aug. 7, 1969 |
| [45] | Patented | June 28, 1971 |
| [73] | Assignee | Nathan E. Knecht<br>Springfield, Oreg. |

[54] INVERTER COMMUTATION CIRCUIT
8 Claims, 2 Drawing Figs.

[52] U.S. Cl. .................................................. 321/45, 321/4
[51] Int. Cl. ................................................. H02m 7/52
[50] Field of Search .......................................... 321/5, 44, 45, 45 (C), 45 (ER), 4

[56] References Cited
UNITED STATES PATENTS

| 3,504,266 | 3/1970 | Schlaback et al. | 321/5 |
| 3,325,716 | 6/1967 | Gomi | 321/45X |
| 3,343,065 | 9/1967 | Gurnett | 321/45X |
| 3,366,867 | 1/1968 | Dodge | 321/45 |
| 3,388,310 | 6/1968 | Etter | 321/45X |
| 3,500,170 | 3/1970 | Charrin et al. | 321/45 |

FOREIGN PATENTS

| 1,113,013 | 5/1968 | Great Britain | 321/45CUX |

Primary Examiner—William H. Beha, Jr.
Attorney—Kolisch and Hartwell

ABSTRACT: An inverter circuit including a silicon-controlled rectifier bridge which requires interrupted DC voltage, and circuitry for supplying such interrupted voltage. Such circuitry includes a silicon-controlled rectifier interrupter through which voltage from a source of continuous DC voltage may be supplied, and a capacitor which through charging and discharging under the influence of another silicon-controlled rectifier bridge controls the operating state of the interrupter.

PATENTED JUN28 1971 3,588,670

INVENTOR
WILLIAM L. KING
BY
Kolisch + Hartwell
ATTORNEYS

INVERTER COMMUTATION CIRCUIT

This invention pertains to an electrical inverter for converting DC power to AC power. More particularly, it pertains to circuitry for supplying interrupted DC voltage to a bridge in such an inverter. For the purpose of illustration herein, the invention is described in conjunction with an inverter which is used in a vehicle.

In an electrical inverter of the type briefly mentioned, it has been found desirable to employ a silicon-controlled rectifier output bridge. Such a bridge is relatively simple, compact and inexpensive to construct, and is capable of carrying (and thus delivering at output terminals) a relatively high current. In the proper operation of such a bridge, different rectifiers therein must be switched to appropriate times between conducting and nonconducting states. And, because of silicon-controlled rectifier, once conducting, must have the voltage across it reduced substantially in order to place it in a nonconducting state, such a bridge must preferably be supplied interrupted rather than continuous DC voltage. If such interrupted voltage is not properly made available, the bridge will not function satisfactorily.

A general object of the present invention is to provide novel circuitry for use in conjunction with a bridge of the type mentioned to assure the proper supply of interrupted DC voltage to the input of the bridge.

Another object of the invention is to provide such circuitry which is simple in construction and reliable in operation.

According to a preferred embodiment of the invention, such circuitry includes an interrupter formed from a silicon-controlled rectifier interposed between the output bridge and a pair of terminals which are adapted to be connected to a source of continuous DC voltage. The operating state of the interrupter is controlled by another bridge (also formed of silicon-controlled rectifiers) which effects charging and discharging of a capacitor. Such charging and discharging is utilized in turn to adjust the voltage across the interrupter. Pulses from a pair of pulse supplies control the operation of the latter-mentioned bridge, whereby the capacitor alternately charges and discharges, and the interrupter is switched recurrently and periodically between its conducting and nonconducting states.

With this type of construction, a proper and reliable supply of interrupted DC voltage is provided.

Figure 2:
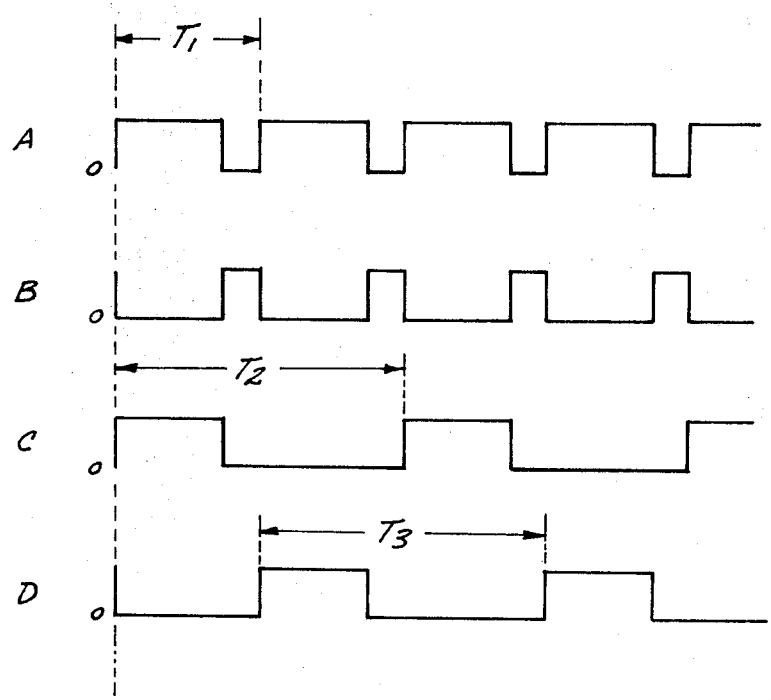

Still another object of the invention is to provide circuitry of the type so far indicated which further includes means for preventing load-induced voltage changes at the output terminals of the output bridge from impairing the operation of rectifiers in such bridge. According to the preferred embodiment of the invention, such means comprises a capacitor connected across the terminals, and a diode connecting each such terminal and one of the terminals mentioned above adapted to be connected to a source of continuous DC voltage. The diodes are oriented to conduct current therethrough toward the latter-mentioned terminals. These and other objects and advantages attained by the invention will become more fully apparent as the description which follows is read in conjunction with the accompanying drawings, wherein:

FIG. 1 is a circuit diagram, partly in block form, illustrating an inverter employing circuitry constructed according to the invention; and FIG. 2 is a diagram illustrating graphically, and on a common time scale, the wave forms of certain voltages which appear at different points in the inverter of FIG. 1. Turning now to the drawings, and referring first to FIG. 1, indicated generally at 10 is an inverter including circuitry as contemplated herein. In the embodiment illustrated, inverter 10 is adapted for use in a vehicle such as a truck for converting DC power to AC power. The inverter includes a pair of conductors, or terminals, 12, 14 which are adapted to be connected to a source of continuous DC voltage, a pair of bridges 16, 18, and a multivibrator circuit shown in block form at 20.

Conductors 12, 14 are connected to a source 21 of continuous DC voltage. Source 21 herein includes a three-phase alternator 22 whose output terminals, 22a, 22b, 22c, are connected to a conventional full-wave rectifier circuit 24. The output terminals of rectifier 24 are connected to conductors 12, 14 in such a manner that the voltage applied to conductor 12 is positive relative to that applied to conductor 14. In a unit, such as the one being described, designed for use in conjunction with a motor vehicle, alternator 22 and rectifier circuit 24 may be the usual ones found as part of the vehicle's electrical system.

Bridge 16 comprises four silicon-controlled rectifiers, or switching devices, 26, 28, 30 32, including gates, or pulses inputs, 26a, 28a, 30a, 32a, respectively. Rectifiers 26, 28 are connected in series between a conductor 34 and conductor 14, with the anode of rectifier 26 connected to conductor 34, and the cathode or rectifier 28 connected to conductor 14. Similarly, rectifiers 30, 32 are connected in series between conductors 34, 14, with the anode of rectifier 30 connected to conductor 34 and the cathode of rectifier 32 connected to conductor 14. Rectifiers 28, 30 which are in one set of opposing branches in bridge 16 are referred to collectively as a connecting means. Such is the case also with respect to rectifiers 26, 32 which are in the other set of opposing branches.

As is well understood by those skilled in the art, with the anode of a silicon-controlled rectifier, such as those shown, sufficiently positive relative to its cathode, and on the occurrence of a positive voltage pulse on its gate, the rectifier switches to a conducting state. It remains in such a state until the voltage between the anode and cathode (with the polarity indicated) drops below a certain value, whereupon the rectifier returns to a nonconducting state.

A diode 36 interconnects conductors 12, 34, with the anode of the diode connected to conductor 12 and the cathode connected to conductor 34. A capacitor 38 interconnects the junctions between rectifiers 26, 28 and between rectifiers 30, 32.

Multivibrator circuit 20 is conventional in construction, and thus is shown only in block form. This circuit includes two sets of output terminals indicated at 40, 42 and 44, 46. Terminals 40, 42, 44, 46 each constitute a pulse supply herein. Terminals 40, 42 are also referred to collectively as an actuating means. When energized, circuit 20 produces at terminals 40, 42, 44, 46 voltage pulses having the wave forms represented at A, B, C, D, respectively, in FIG. 2.

Voltage A changes in level recurrently and periodically between about ground, or zero, voltage and some positive voltage, and has a period of $T_1$ of about one one-hundred and twentieth of a second. The level of voltage A is positive for about 62 percent for period $T_1$, and is at ground potential for the balance of the period.

Voltage B is the inverse of voltage A. Thus, voltage B also changes between ground and some positive potential (substantially the same as that mentioned in conjunction with voltage A), and has a period which is the same as that of voltage A. Voltage B remains at ground potential of about 62 percent of each period, an is positive for the balance of the period. As voltage A rises, voltage B drops, and vice versa.

Voltage C alternates between ground and positive potential (substantially the same as that mentioned above), and has a period $T_2$, of about one-sixtieth of a second. During each period $T_2$, this voltage remains positive for about 30 percent of the period, and is at ground potential for the balance of the period. The relationships in time between changes in voltage C and changes in voltages A, B, are as indicated in FIG. 2.

Voltage D also alternates between ground and positive potential (which is substantially the same as referred to above), and has a period $T_3$ of about one-sixtieth of a second. The waveform of voltage D is similar to that of voltage C, with voltage D remaining positive for about 30 percent of each period $T_3$, and being at ground potential for the balance of the period. The relationship in time between voltages C, D is as indicated in FIG. 2.

Terminals 40 is connected to gate 28a through a diode 48 and a resistor 50, and is connected to gate 30a through a diode 52 and a resistor 53. Similarly, terminal 42 is connected to gates 26a, 32a through diodes 56, 58, respectively, and resistors 60, 62, respectively.

Explaining briefly the operation of bridge 16, with voltage from source 21 applied between conductors 12, 14, prior to operation of multivibrator circuit 20, all rectifiers in the bridge are in nonconducting states. With the multivibrator operating, a positive voltage change (pulse) on terminal 40 (due to voltage A) places rectifiers 28, 30 in conducting states. As a consequence, capacitor 38 becomes connected in one direction between conductors 34, 14, and charges, with its right side in FIG. 1 positive relative to its left side in the FIG. Capacitor 38 charges substantially to the voltage existing between conductors 34, 14, and in the embodiment illustrated this takes about 2 milliseconds to occur. With the capacitor so charged, the voltages across rectifiers 28, 30 drop below the levels required to maintain these rectifiers in conducting states. Thus, rectifiers 28, 38 return to nonconducting states.

This situation remains until a positive voltage change (pulse) occurs on terminal 42 (due to voltage B). On such happening, rectifiers 26, 32 are switched to conducting states, and capacitor 38 becomes connected between conductors 34, 14 in the opposite direction from that mentioned above. Capacitor 38 then discharges (and under the influence of voltage form source 21 tends to charge in the opposite direction), and rectifiers 26, 32 return to nonconducting states. Such return of rectifiers 26, 32 to nonconducting states occurs about 1 millisecond after the pulses just previously mentioned which placed them in conducting states.

The operation just described then repeats itself recurrently with continued cycles of voltage changes of the type just indicated occurring on terminals 40, 42. With voltages A, B the voltages existing on terminals 40, 42, respectively, the time between a positive voltage change on terminal 40 and the next following positive voltage change on terminal 42 is about 5.3 milliseconds. The time between a positive voltage change on terminal 42 and the next following positive voltage change on terminal 40 is about 3 milliseconds.

Bridge 18 is somewhat similar in construction to bridge 16, and includes silicon-controlled rectifiers 64, 68, 70, 72 which are similar to the silicon-controlled rectifiers already described. Rectifiers 64, 68, 70, 72 include gates 64a, 68a, 70a, 72a, respectively. The anodes of rectifiers 64, 70 are connected to conductor 34 through a conductor 71, a diode 73 and a silicon-controlled rectifier, or interrupter means, 74. Rectifier 74 is similar to the silicon-controlled rectifiers so far described. Conductors 71, 14 constitute an input for bridge 18. The gate, or pulses input, 74a of rectifier 74 is connected to terminal 40 through a resistor 76 and a diode 78. The cathodes of rectifiers 68, 72 are connected to conductor 14. The cathodes of rectifiers 64, 70 are connected to the anodes of rectifiers 68, 72, respectively. The junction between rectifiers 64, 68 is connected to a conductor 96, and the junction between rectifiers 70, 72 is connected to a conductor 98. Conductors 96, 98 together constitute an output for bridge 18.

Connected between conductors 96, 98 is a capacitor 100. Conductors 96, 98 are connected to conductor 12 through diodes 102, 104, respectively. It will be noted that these diodes are oriented to permit current flow therethrough toward conductor 12.

Output terminal 44 of multivibrator circuit 20 is connected to gates 64a, 72a through diodes 80, 82 respectively, and resistors 84, 86, respectively. Similarly, terminal 46 is connected to gates 68a, 70a through diodes 88, 90 respectively, and resistors 94, 94, respectively.

In the absence of any external load connected between conductor 96, 98, and in the case of a continuous DC voltage applied between conductors 71, 14, bridge 18 performs in much the same fashion as bridge 16 with positive voltage changes (pulses) occurring alternately on terminals 44, 46. However, with an external load connected between conductors 96, 98, a supply of interrupted DC voltage must be provided between conductors 71, 14 is the rectifiers in the bridge are to be returned satisfactorily to nonconducting states at appropriate times. As will now be explained, in the operation of inverter 10 as a whole, such interrupted DC voltage is provided through the cooperative operations of bridge 16, capacitor 38 and rectifier 74, under the control of pulses on terminals 40, 42.

With DC voltage form source 21 applied to conductors 12, 14, prior to operation of multivibrator circuit 20, all silicon-controlled rectifiers in inverter 10 are in nonconducting states. Sufficient bias voltage exists across all of the silicon-controlled rectifiers whereby a rectifier may be placed in a conducting state on its gate receiving a positive voltage pulse. The voltage between conductors 96, 98 is zero.

With operation of the multivibrator circuit, and on a positive voltage change occurring on terminal 40, rectifier 74, and rectifiers 28, 30 in bridge 16, are placed in conducting states. This results in DC voltage from the source being applied to bridge 18 through conductors 71, 14. Capacitor 38 charges with its right side in FIG. 1 positive relative to its other side. As can be seen from FIG. 2, simultaneously with a positive voltage change on terminal 40, there is a positive voltage change either on terminal 44 (due to voltage C), or on terminal 46 (due to voltage D). Assuming that initially such a change occurs on terminal 44, this causes rectifiers 64, 72 to switch to conducting states. As a consequence, a voltage is applied between conductors 96, 98, with conductor 96 positive relative to conductor 98.

This situation remains until there occurs a positive voltage change on terminal 42, whereupon rectifiers 26, 32 are placed in conducting states. This operation results in capacitor 38 discharging, with such action causing rectifier 74 to return to a nonconducting state through dropping the bias voltage across the rectifier to below the level required to maintain conduction in the rectifier.

Simultaneously with the positive voltage change just mentioned on terminal 42, positive voltage is removed form terminal 44. With removal of this voltage, and with rectifier 74 returned to a nonconducting state, rectifiers 64, 72 in bridge 18 are also returned to nonconducting states. The voltage between conductor 96, 98 then returns to zero.

This situation remains until the next following positive voltage change on conductor 40 whereupon rectifiers 28, 30, 74, are placed again in conducting states, and capacitor 38 again begins charging with its right side in FIG. 1 positive to its left side. Simultaneously with this positive voltage change on terminal 40, there is a positive voltage change on terminal 46. The latter mentioned change results in rectifiers 68, 70 being placed in conducting states, whereupon a voltage is again applied between terminals 96, 98. In this case, terminal 98 is positive relative to terminal 96.

This situation remains until there occurs a positive voltage change again on terminal 42 whereupon capacitor 38 is again discharged, and rectifier 74 is again placed in nonconducting state. Simultaneously with the voltage change just mentioned on terminal 42, positive voltage is removed from terminal 46. Under these circumstances, rectifiers 68, 70 are returned to nonconducting states, and the voltage between conductors 96, 98 is retuned to zero.

The operation just described then continues to repeat so long as voltage form source 21 is applied between terminals 12, 14, and multivibrator circuit 20 operates. Thus it will be apparent that interrupted DC voltage is applied through conductor 71, 14 to bridge 18, with the bridge supplying between conductor 96, 98 a recurrent, periodically varied, or AC voltage. The frequency of this voltage in the embodiment illustrated is about 60 cycles per second.

With interrupted DC voltage supplied bridge 18 due to the operation of bridge 16, capacitor 38 and rectifier 74 under the control of pulses on terminals 40, 42 proper returning of the silicon-controlled rectifiers in bridge 18 to nonconducting states is assured. As a consequence, an external load connected between conductors 96, 98 has no appreciable effect on the proper operation of the rectifiers in bridge 18.

Capacitor 100 and diodes 102, 104, also assist in minimizing the effect which an external load has on the operation of bridge 18.

In the overall operation of inverter 10, the coordination of the voltages on terminals 40, 42 and those on terminals 44, 46 is important. With voltages A, B, C, D related in time as indicated in FIG. 2, good uniformity of obtained in the AC voltage produced between conductors 96, 98. While a single multivibrator circuit has been shown herein, it is appreciated that more than one circuit (with proper coordination between circuits) may be used. Also, the frequency, periods and times mentioned herein may be changed to adapt to different circumstances.

Thus, while a preferred embodiment of the invention has been described herein, it is appreciated that variations and modifications may be made without departing from the spirit of the invention.

I claim:

1. In electrical apparatus including a circuit for producing from interrupted DC voltage a recurrent and periodically varied voltage, said circuit having an input adapted to be supplied interrupted DC voltage:

a pair of terminals adapted to be connected to a source of continuous DC voltage having one polarity;

electronic interrupter means operatively interconnecting said terminals and said input having a closed state permitting the supply of voltage from said terminals to said input with voltage in one direction and above a certain level across the interrupter means and an open state blocking such supply to which the interrupter means switches on reduction of the voltage across it to below said certain level;

a DC voltage of said one polarity between said terminals tending to produce a voltage in said one direction across said interrupter means; and interrupter control means operatively connected to said interrupter means operable recurrently and periodically to reduce to below said certain level the voltage across the interrupter means, said interrupter control means comprising a capacitor, first electronic connecting means actuatable to connect said capacitor in one direction between said terminals, second electronic connecting means actuatable to connect said capacitor in the opposite direction between said terminals, and actuating means operatively connected to said first and second connecting means operable in recurrent an periodic cycles to actuate the same alternately.

2. The apparatus of claim 1, wherein each connecting means comprises a pair of triggerable switching devices, each interposed between a different side of said capacitor and different terminal.

3. The apparatus of claim 2, wherein the switching devices of said first and second connecting means take the form of a bridge, with the switching devices of said first connecting means disposed in one set of opposite branches of said bridge, and the switching devices of said second connecting means disposed in the other set of opposite branches.

4. The apparatus of claim 2, wherein each switching device has a conducting and nonconducting state, and includes a pulse input adapted to receive a pulse, with the device being switchable from its nonconducting to its conducting state on its said pulse input receiving a pulse, and said actuating means comprises a pair of pulse supplied, each effective to supply a series of pulses, with one supply operatively connected to the pulse inputs of said switching devices of said first connecting means, and the other supply operatively connected to the pulse inputs of the switching devices of said second connecting means, and with the pulses supplied by said one supply alternating with those supplied by said other supply.

5. The apparatus of claim 4, wherein each switching device comprises a silicon-controlled rectifier.

6. The apparatus of claim 4, wherein said interrupter means comprises a switching device, similar to the devices previously mentioned, having a pulse input operatively connected to one of said supplies.

7. The apparatus of claim 4, wherein the circuit for producing recurrent and periodically varied voltage further comprises an output, and a silicon-controlled rectifier bridge operatively interconnecting said input and said output, each rectifier of said bridge having a pulse input, there is another pair of pulses supplies, each effective to supply a series of pulses, and each operatively connected to the pulse inputs of a different pair of rectifiers in the bridge, and the pulses that are supplied by said other pair of supplies are related in time to those supplied by said first-mentioned pair of supplies.

8. The apparatus of claim 1, wherein the circuit for producing recurrent and periodically varied voltage further comprises an output and a silicon-controlled rectifier bridge operatively interconnecting said input and said output, and there is a capacitor connected across said output, and a pair of diodes connecting opposite sides of said output to one of said terminals, with each diode oriented in a direction permitting current flow therethrough toward said one terminal.